(12) United States Patent
Bill

(10) Patent No.: US 11,981,167 B2
(45) Date of Patent: May 14, 2024

(54) AUTOMATIC OPERATION OF A PLURALITY OF TYRE MONITORING DEVICES

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 207 days.

(21) Appl. No.: 17/418,280

(22) PCT Filed: Jun. 16, 2020

(86) PCT No.: PCT/EP2020/066549
§ 371 (c)(1),
(2) Date: Jun. 25, 2021

(87) PCT Pub. No.: WO2020/254280
PCT Pub. Date: Dec. 24, 2020

(65) Prior Publication Data
US 2022/0024264 A1    Jan. 27, 2022

(30) Foreign Application Priority Data

Jun. 17, 2019 (GB) ..................................... 1908628

(51) Int. Cl.
*B60C 23/04* (2006.01)
(52) U.S. Cl.
CPC ...... *B60C 23/0479* (2013.01); *B60C 23/0415* (2013.01); *B60C 2200/02* (2013.01)
(58) Field of Classification Search
CPC ............ B60C 23/0479; B60C 23/0415; B60C 2200/02
See application file for complete search history.

(56) References Cited

U.S. PATENT DOCUMENTS 7,508,299 B2    3/2009  Thomas
2003/0006895 A1  1/2003  Drake et al.
(Continued)

FOREIGN PATENT DOCUMENTS

CN    105008150    10/2015
CN    109070665    12/2018
(Continued)

OTHER PUBLICATIONS

International Search Report for PCT/EP2020/066549 dated Sep. 24, 2020, 4 pages.
(Continued)

*Primary Examiner* — Curtis A Kuntz
*Assistant Examiner* — James E Munion
(74) *Attorney, Agent, or Firm* — Nixon & Vanderhye P.C.

(57) ABSTRACT

A method of checking tyre pressures using a control device having a wireless communication interface and at least one tyre monitoring device is disclosed. Each tyre monitoring device is mounted on a respective wheel of a vehicle and comprises a wireless communication interface and a pressure sensor for sensing an inflation pressure of a tyre on the respective wheel. The method includes, at the control device: receiving an input and, responsive to the input: identifying a plurality of tyre monitoring devices within a wireless communication range of the control device, wherein the identifying comprises receiving responses from each tyre monitoring device within the wireless communication range, each response including a vehicle identifier associated with a vehicle upon which the tyre monitoring device is installed.

12 Claims, 9 Drawing Sheets

(56) References Cited

U.S. PATENT DOCUMENTS

| | | |
|---|---|---|
| 2015/0015389 A1 | 1/2015 | McIntyre et al. |
| 2018/0238760 A1 | 8/2018 | Trost |
| 2019/0184772 A1 | 6/2019 | Bill et al. |

FOREIGN PATENT DOCUMENTS

| | | | | |
|---|---|---|---|---|
| EP | 2 910 393 | | 8/2015 | |
| EP | 3 118 030 | | 1/2017 | |
| EP | 3118030 A1 | * | 1/2017 | ......... B60C 23/0433 |
| GB | 1484341 | | 9/1977 | |
| GB | 2 536 496 | | 9/2016 | |
| GB | 2536496 A | * | 9/2016 | ............ B60C 23/04 |
| WO | 8902837 | | 4/1989 | |
| WO | 2011/098532 | | 8/2011 | |
| WO | WO-2011098532 A1 | * | 8/2011 | ............ B60C 23/00 |
| WO | 2018113471 A1 | | 6/2018 | |

OTHER PUBLICATIONS

Written Opinion of the ISA for PCT/EP2020/066549 dated Sep. 24, 2020, 6 pages.
Combined Search and Examination Report for GB1908628.9 dated Oct. 31, 2019, 5 pages.
EP Search Report for Application No. 23177082.7, dated Oct. 16, 2023, 26 page.
Chinese Office Action and English Machine Translation for Application 202080007629.2, 26 pages, dated Dec. 18, 2023.

* cited by examiner

AUTOMATIC OPERATION OF A PLURALITY OF TYRE MONITORING DEVICES

CROSS REFERENCE TO RELATED APPLICATIONS

The present application is a National Phase of International Application Number PCT/EP2020/066549 filed Jun. 16, 2020, which designated the U.S. and claims priority benefits from Great Britain Application Number GB 1908628.9 filed Jun. 17, 2019, the entire contents of each of which are hereby incorporated by reference.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading but can still take time due to a requirement to travel from wheel to wheel measuring the pressures.

It would be desirable to provide a tyre pressure measurement system which addresses some, or all, of these points.

SUMMARY

According to a first aspect of the invention, there is provided a method of checking tyre pressures using a control device having a wireless communication interface and at least one tyre monitoring device, each tyre monitoring device mounted on a respective wheel of a vehicle and comprising a wireless communication interface and a pressure sensor for sensing an inflation pressure of a tyre on the respective wheel, the method comprising, at the control device:
  receiving an input and, responsive to the input:
  identifying a plurality of tyre monitoring devices within a wireless communication range of the control device, wherein the identifying comprises receiving responses from each tyre monitoring device within the wireless communication range, each response including a vehicle identifier associated with a vehicle upon which the tyre monitoring device is installed;
  selecting a vehicle identifier to be the subject of the request to check a tyre pressure based on the received responses; and
  sending a request to check tyre pressure to at least one tyre monitoring device associated with the selected vehicle identifier.

Optionally, the method further comprises:
  determining that the plurality of tyre monitoring devices are associated with a same vehicle identifier; and
  automatically selecting the same vehicle identifier to be the subject of the request to check a tyre pressure.

Optionally, the method further comprises:
  determining that the plurality of tyre monitoring devices are associated with at least two different vehicle identifiers; and
  selecting a vehicle identifier associated with the largest number of the plurality of tyre monitoring devices to be the subject of the request to check tyre pressure.

Optionally, the method further comprises:
  determining that the plurality of tyre monitoring devices are associated with at least two different vehicle identifiers;
  determining a tyre monitoring device closest to the control device; and
  selecting a vehicle identifier associated with the tyre monitoring device closest to the control device to be the subject of the request to check tyre pressure.

Optionally, the method further comprises:
  determining that the plurality of tyre monitoring devices are associated with at least two different vehicle identifiers;
  determining a vehicle identifier which is associated with responses from tyre monitoring devices associated with all the wheels of a same vehicle; and
  selecting the vehicle identifier to be the subject of the request to check tyre pressure.

Optionally, the method further comprises:
  providing an indication of a vehicle identifier which is the subject of the request to check tyre pressure via the control device;
  receiving an input indicative of a different vehicle identifier; and
  sending a request to check tyre pressure to tyre pressure monitoring devices associated with the different vehicle identifier.

According to a second aspect of the present invention, there is provided a control device for controlling a plurality of tyre monitoring devices, the control device comprising:
  a wireless communication interface configured to communicate with the plurality of tyre monitoring devices;
  storage configured to store computer-readable instructions of a control application that controls the plurality of tyre monitoring devices; and
  a processor configured to execute the computer-readable instructions stored in the storage to:
  initiate a scan for plurality of tyre monitoring devices proximal the control device using the wireless communication interface;
  receive responses from tyre monitoring devices of the plurality of tyre monitoring devices, each response including a vehicle identifier associated with a vehicle upon which the tyre monitoring device is installed;
  select a vehicle identifier automatically without user input; and
  cause the wireless communication interface to send a request to check a tyre pressure to at least one tyre monitoring device associated with the vehicle identifier.

Optionally, the processor is configured to:
  determine that the plurality of tyre monitoring devices are all associated with a first vehicle identifier; and
  select the first vehicle identifier to be the subject of the request to check a tyre pressure.

Optionally, the processor is configured to:
  determine that the plurality of tyre monitoring devices are associated with at least two different vehicle identifiers; and select a vehicle identifier associated with the largest number of the plurality of tyre monitoring devices to be the subject of the request to check tyre pressure.

Optionally, the processor is configured to:

determine that the plurality of tyre monitoring devices are associated with at least two different vehicle identifiers;

determine a tyre monitoring device closest to the control device; and select a vehicle identifier associated with the tyre monitoring device closest to the control device to be the subject of the request to check tyre pressure.

Optionally, the processor is configured to:

determine that the plurality of tyre monitoring devices are associated with at least two different vehicle identifiers;

determine a vehicle identifier which is associated with responses from tyre monitoring devices associated with all the wheels of a same vehicle; and selecting the vehicle identifier to be the subject of the request to check tyre pressure.

According to a third aspect of the present invention, there is provided, a computer-readable medium comprising computer-readable instructions that, when executed by a processor of a control device, cause the control device to:

use a wireless communication interface of the control device to scan for tyre monitoring devices within wireless communication range from the control device;

present on a display of the control device, an identifier for at least one tyre monitoring device identified in the scan;

receive user input of an instruction to check a tyre pressure to be sent to a tyre monitoring device to initiate a tyre pressure check.

Further features and advantages of the invention will become apparent from the following description of preferred examples of the invention, given by way of example only, which is made with reference to the accompanying drawings.

DETAILED DESCRIPTION

In the following description, for purposes of explanation, numerous specific details of certain examples are set forth.

Reference in the specification to "an example" or similar language means that a particular feature, structure, or characteristic described in connection with the example is included in at least that one example, but not necessarily in other examples.

Certain methods and systems described herein relate to the operation of a sensor network in an aircraft. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, a method of checking tyre pressures using a control device is provided in which tyre monitoring devices nearby the control device are automatically identified in response to the control device receiving an input. In this way, a tyre pressure measurement routine can be initiated by a single input to the control device thereby reducing the number of interactions required to start a tyre pressure measurement process. This also reduces the time taken to carry out tyre pressure measurements.

According to examples herein, a control device is provided that initiates a scan for nearby tyre monitoring devices, and, in some examples, instructs a tyre measurement process, without requiring further user intervention after a first input. This simplifies the operation of the control device.

According to examples herein, a control device is provided that receives multiple counter values from corresponding tyre monitoring devices and converts the counter values to a time. This provides synchronisation between independent counter values associated with different tyre monitoring devices without requiring a real-time clock on each of the tyre monitoring devices or time synchronization of the tyre monitoring devices themselves. In addition, events occurring at the different tyre monitoring devices and associated with respective counter values can be reconciled with one another using a consistent reference point, that is, the time local to the control device or any other suitable reference time.

According to examples herein, a tyre monitoring system comprises a plurality of tyre monitoring devices having internal counters and a control device. This provides a system that can be synchronised temporally by converting values of internal counters of corresponding tyre monitoring devices to a common time reference so that the timing of events occurring at the different monitoring devices can be determined relative to each other despite each device having unsynchronized counters.

Example Tyre Monitoring System

Figure 1:
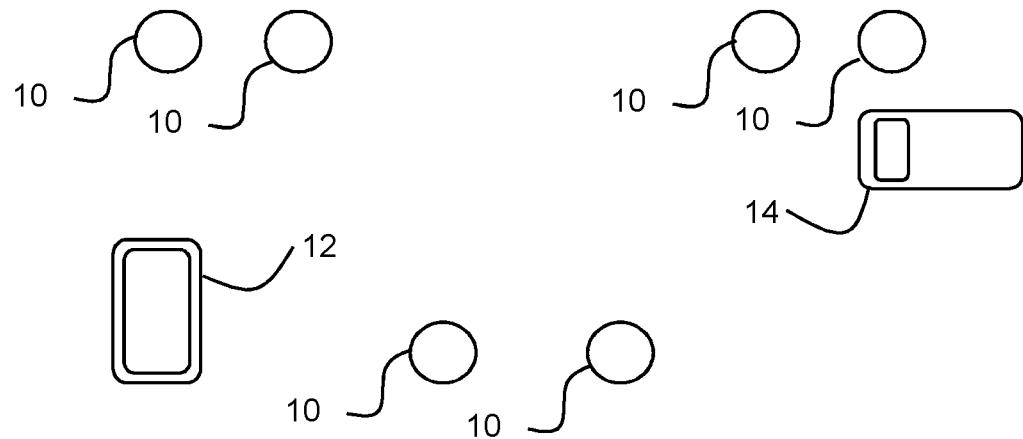
FIG. 1 shows a schematic representation of a tyre pressure sensor system according to a first example of the invention.

FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
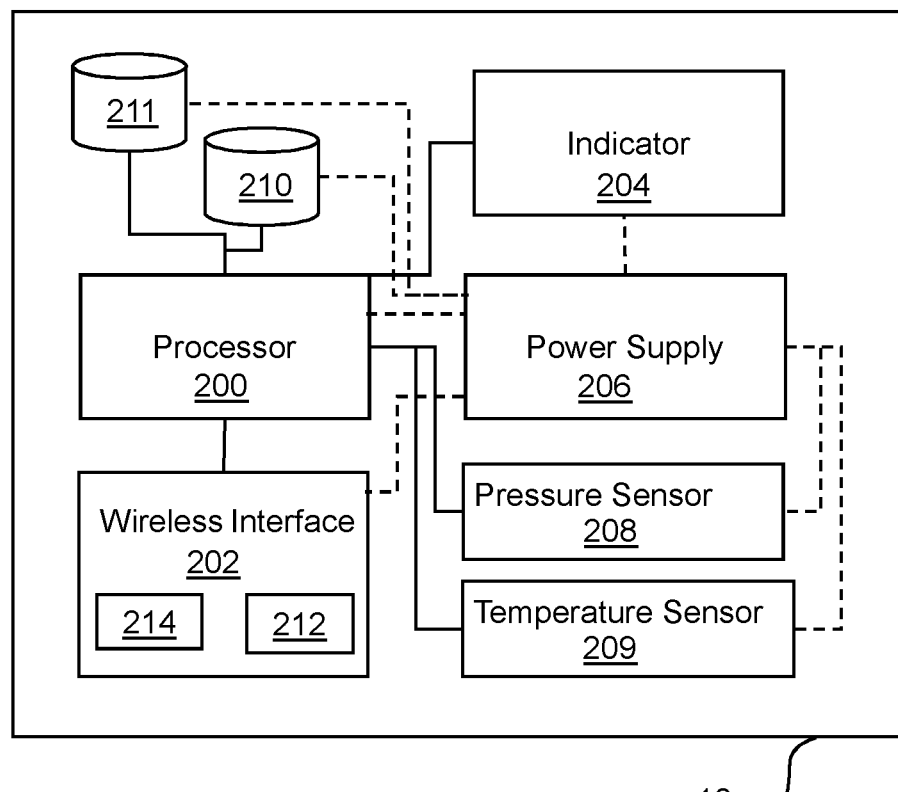
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre. The tyre monitoring device 10 includes a processor 200, a wireless communication interface 202, an indicator 204, a power supply 206, and a pressure sensor 208, a temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and receive data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
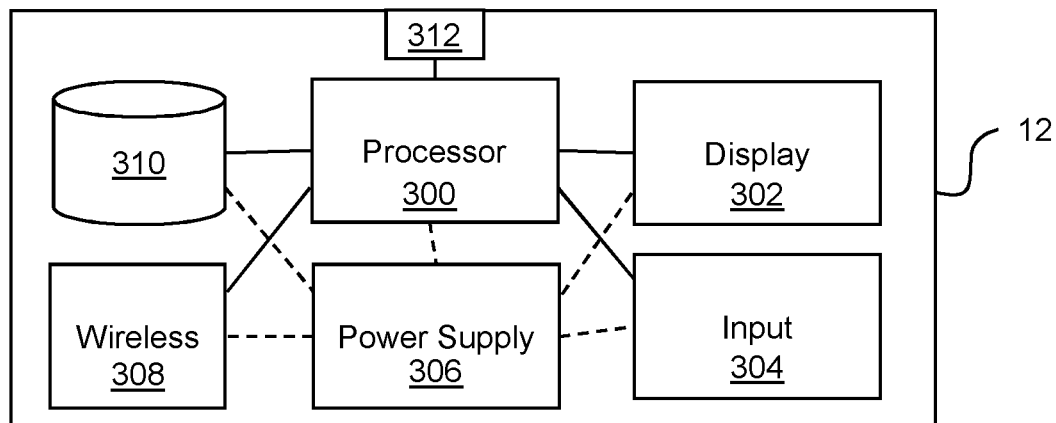
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi_33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
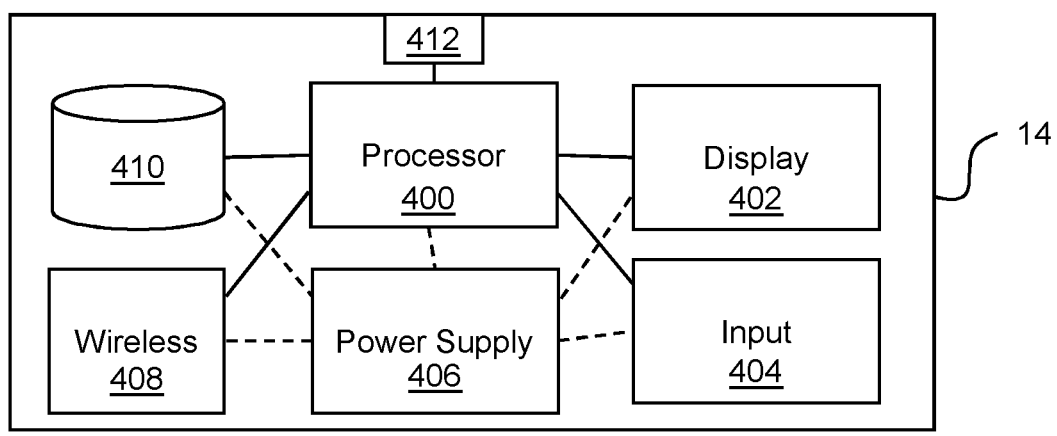
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short-range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short-range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short-range wireless communication interface for the transmission of configuration commands. In these examples, separate application software may be provided on the control device which can be executed to cause the control device to function as a configuration device.

Figure 5:
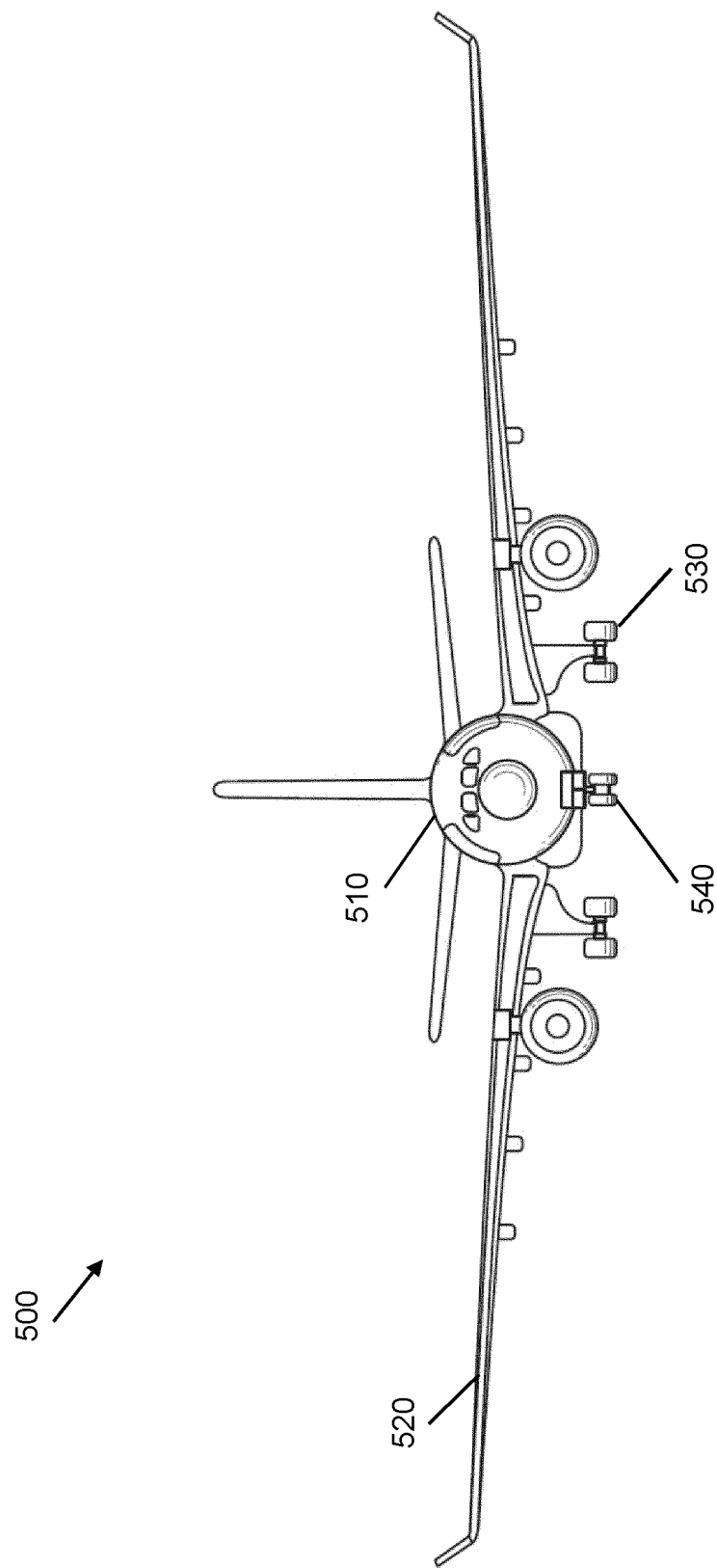
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure Check Processes

Figure 6:
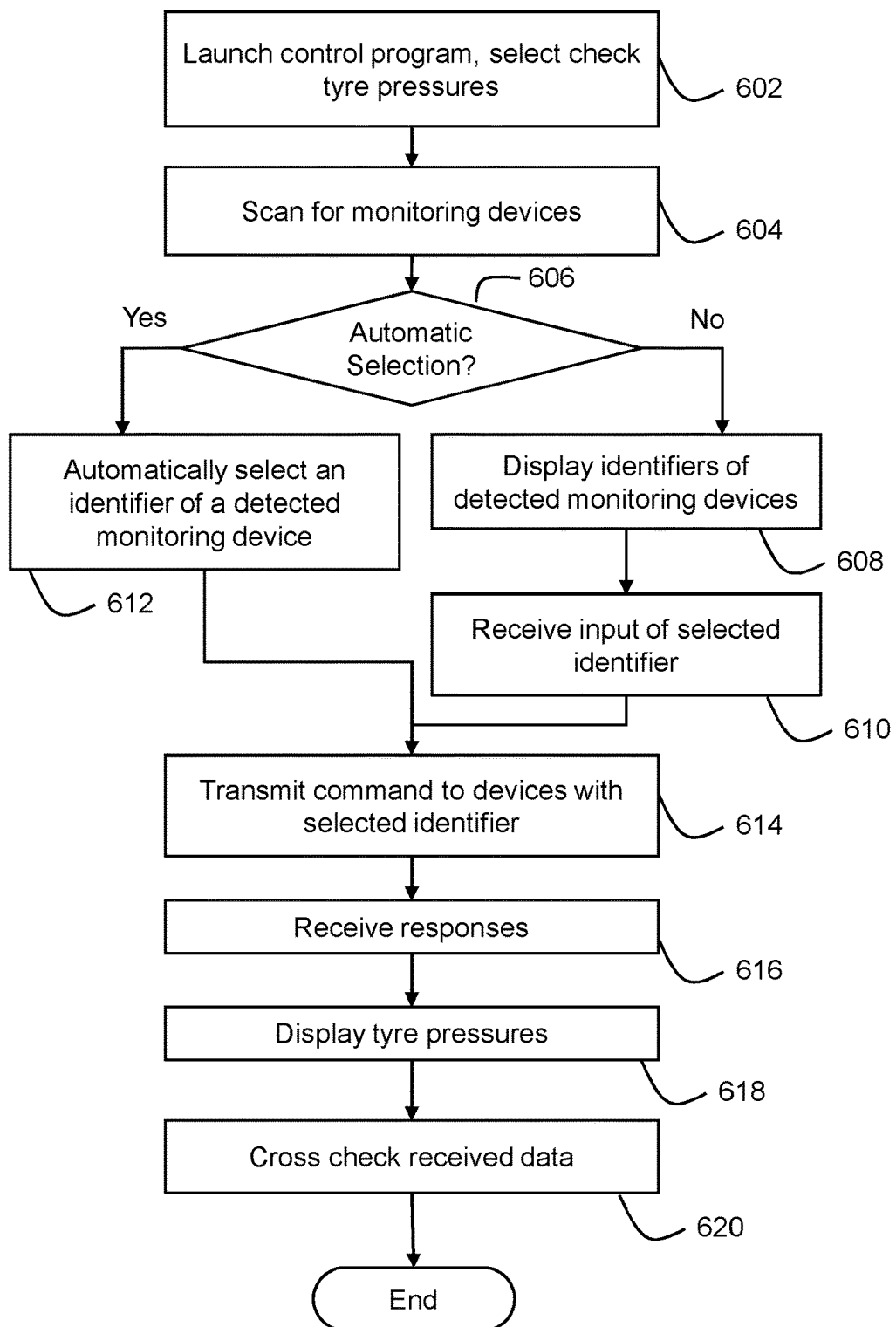
FIG. 6 shows a flow chart of a tyre pressure check process that can be used with the example of FIG. 1.

FIG. 6 shows a flow chart of a tyre pressure check process that can be used with the example of FIG. 1. First, at block 602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. This can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 7:
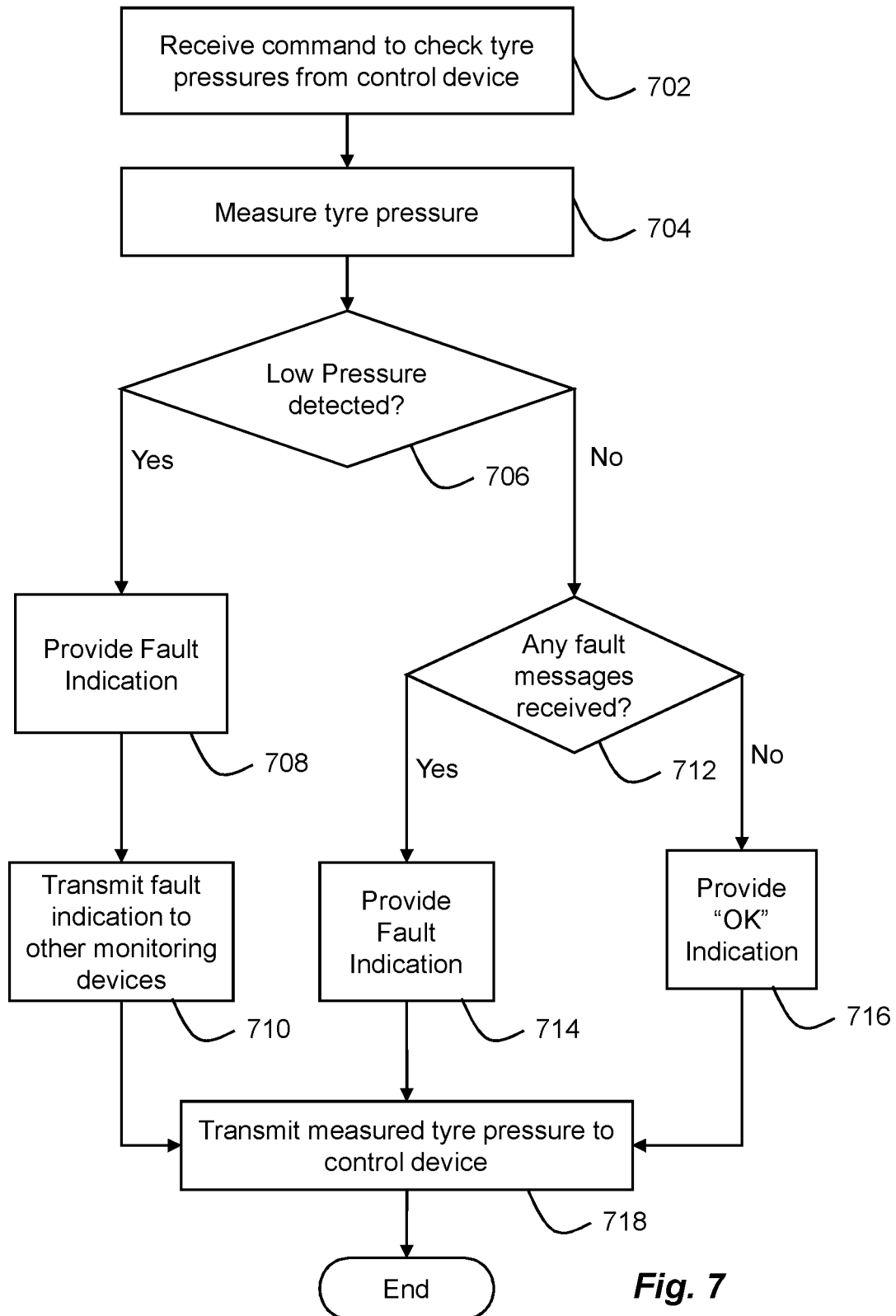
FIG. 7 shows a flow chart of tyre pressure check process that can be used by the tyre monitoring device of FIG. 2.

FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command. This data may include further information such as stored reference pressure, determined status, and wheel position. Transmission of additional information may allow verification of the correct operation of the tyre monitoring device and a check that the configuration data stored in the storage has not changed or has been set up correctly.

The transmission in block 718 may be sent directly to a control device 12, to another tyre monitoring device 10 for onward routing, or to an access point or other wireless node.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Automatic Initiation of a Tyre Measurement Process

In examples, a tyre pressure check may be carried out following an automatic initiation of a tyre measurement or pressure check process and/or following an automatic selection of a specific vehicle (and therefore its associated tyre monitoring devices). One method of initiating a tyre pressure check has been described above with reference to FIG. 6, whereby a user initiates launch of the control application on the control device. In another example, the tyre measurement or pressure check process may be automatically initiated by another system or application of the control device, for example, an on-board system on a vehicle to which wheels having tyre monitoring devices are attached, whether or not user input has been received by the control device.

Figure 8:
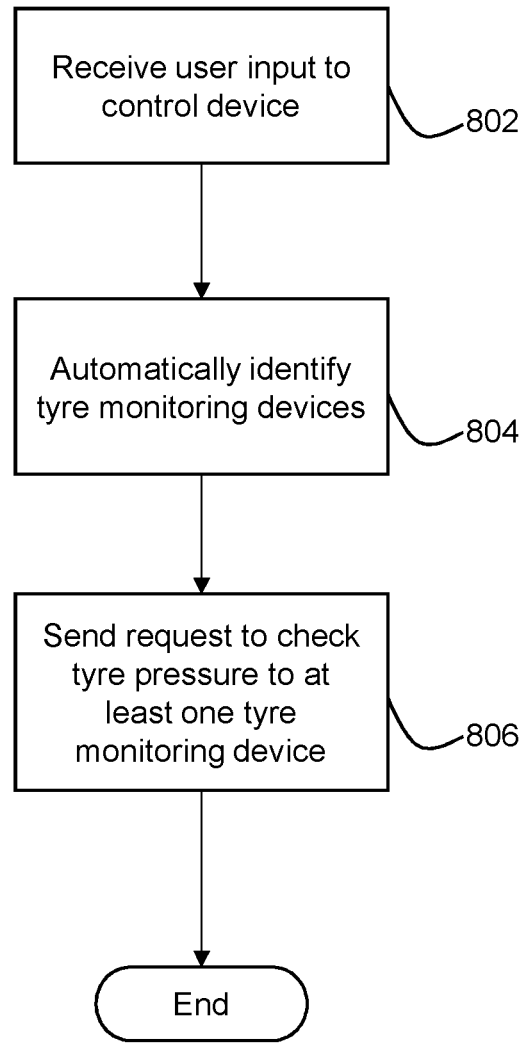
FIG. 8 shows a flow chart of initiating a tyre pressure measurement process that can be used with the example of FIG. 1.
Figure 9:
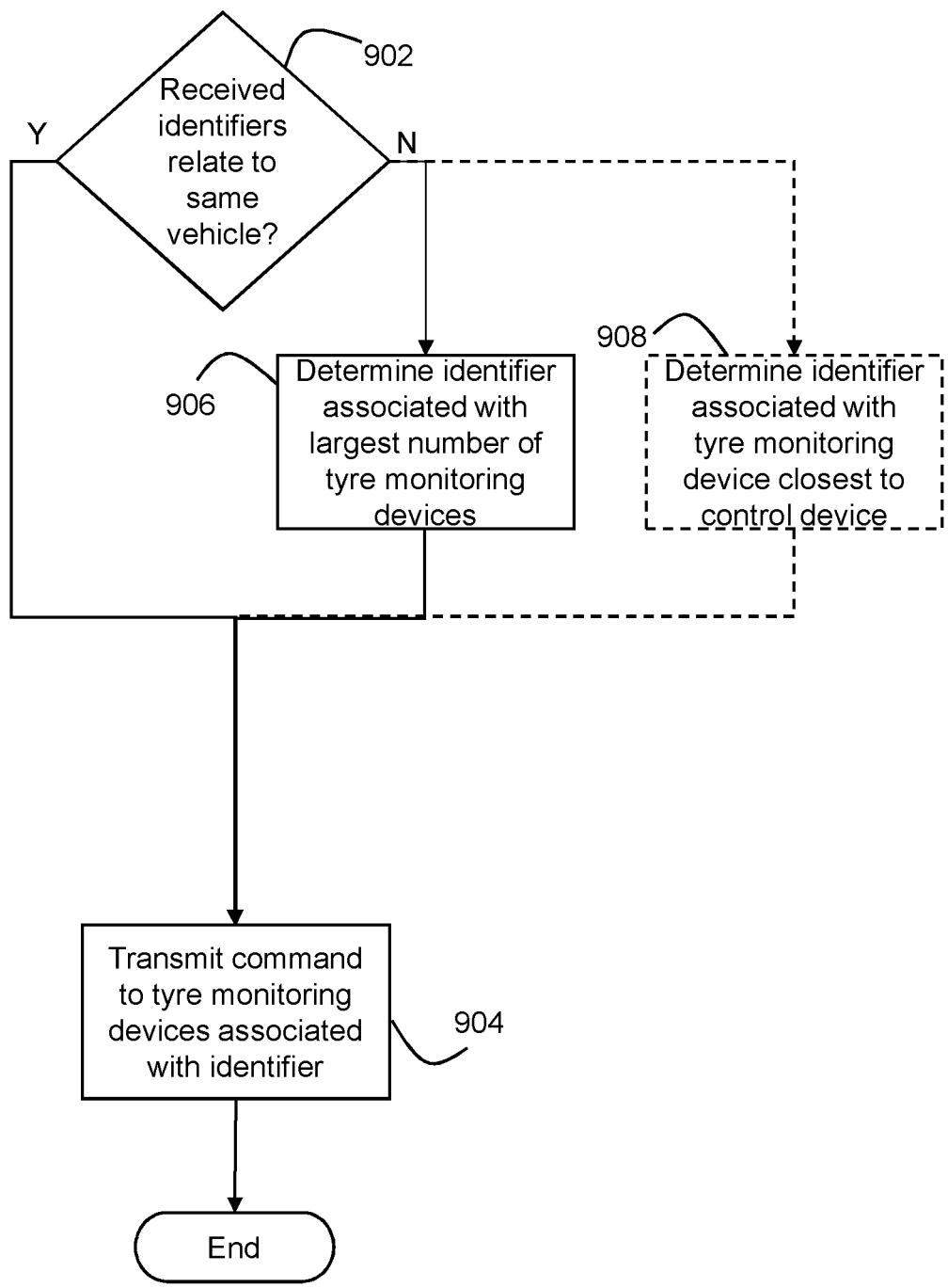
FIG. 9 is a flow chart of automatically selecting a vehicle identifier that can be used with the example of FIG. 1.

FIGS. 8 and 9 illustrate further processes in which the automatic implementation of particular steps reduces the number of user interactions with the control device. This consequently reduces the time taken to carry out tyre pressure checks and reduces the likelihood of user error.

FIG. 8 is a flow chart of initiating a tyre pressure measurement process according to an example and provides more detail to specific aspects of the method described in relation to FIG. 6. The process of FIG. 8 is used when a tyre monitoring system has been fitted to a vehicle, such as the aircraft of FIG. 5.

First, at block 802, a user input is received at the control device 12 for initiating a tyre pressure check or other tyre measurement. In one example, at block 802, the control device 12 may already be running the tyre monitoring control application and actively displaying an interface of the application on the display 302 of FIG. 3, whereby the user input may be received by the interface, for instance, to select an icon that causes the tyre pressure monitoring process to start. In this case, the user may be presented with a number of different processes that the control device can initiate, the user selects a tyre pressure monitoring/checking process from amongst other processes such as a maintenance process and a change of sensor process.

In another example, at block 802, the control device 12 may be running the tyre monitoring control application but not actively displaying an interface of the application, for example if a user has previously opened the control application and then opened other applications on the control device 12. In other words, the control application is open in the background. In such a scenario, the control application may be considered to be in an inactive or standby state and the input received by the control device may be a selection of the control application so that the control application is re-activated and actively displayed by the display 302 of the control device 12. This re-activation may form the user input to initiate a tyre pressure check.

In another example, at block 802, the tyre monitoring control application may not be running on the control device 12, whereby the user input may be received and cause the control device 12 to launch the tyre monitoring control application and initiation of a tyre pressure check on launch.

Next, at block 804, the control device 12 identifies one or more tyre monitoring devices nearby the control device 12, that is, within a predetermined distance or wireless communication range from the control device 12. For example, a wireless command, such as a probe command, may be sent which causes the tyre monitoring devices which receive the command to respond. In this way the identification is limited to the wireless communication range of the control device. For example, the range or predetermined distance may be less than 100 m or less than 50 m. Depending on the communication range and location, tyre monitoring devices associated with more than one vehicle may be detected. For example, several aircraft may be in the same hanger in range of the control device, discussed in more detail below in relation to FIG. 9. In one example, as part of the identifying or scanning for tyre monitoring devices, devices that are in range of the control device 12 may send responses to the control device 12, where each response identifies the corresponding tyre monitoring device. The response may also include an identifier of the vehicle on which the tyre monitoring device is installed, such as an aircraft tail ID.

At block 806, a request or command to check a tyre pressure is sent to at least one of the identified tyre monitoring devices. In one example, an interface of the tyre monitoring control application may be displayed to a user, where the interface presents selectable icons corresponding to the vehicle identifiers associated with the respective identified tyre monitoring devices. An input selecting one or more vehicle identifiers may be received by the interface from a user, where the input is based on responses received from devices in range of the control device and the input is considered to be an instruction to check a tyre pressure at the vehicle corresponding to the selected vehicle identifier, so that the request is sent to tyre monitoring devices associated with the selected vehicle identifier, such as those related to a selected aircraft in the hanger.

FIG. 9 is a flow chart of an example of automatically selecting a vehicle identifier, so that user input is not required to select a vehicle. It provides more detail of the methods described in relation to step 612 of FIG. 6, according to an example. In some examples, the method of FIG. 9 may be implemented after the automatic initiation of the method of FIG. 8.

First, at block 902, it is determined whether vehicle identifiers received at the control device 12, forming information included in responses received from a plurality of identified tyre monitoring devices, are the same and thus relate to the same vehicle. If the identifiers are determined to relate to the same vehicle, the yes "Y" branch is followed to block 904. If the identifiers are determined to relate to different vehicles, the no "N" branch is followed to either block 906 or block 908. (Block 908 is an alternative to block 906 and is therefore depicted with dashed lines in FIG. 9.)

At block 906, a determination is made as to which vehicle identifier is associated with the largest number of responses. That vehicle identifier is then selected to be the subject of a command for a tyre pressure check.

At block 908, a determination is made as to which tyre monitoring device is closest to the control device 12 and the vehicle identifier associated with the closest tyre monitoring device is selected to be the subject of a command for a tyre pressure check. For example, the responses from the tyre monitoring devices may include an RSSI or other indication of the strength of the command which caused the tyre monitoring device to respond. The response with the highest RSSI is indicative of a closest tyre monitoring device. After the determination of either block 906 or block 908 has been carried out, the method proceeds to block 904.

At block 904, a command to perform a tyre pressure check is transmitted to the tyre monitoring devices associated with the selected vehicle identifier, that is, either the vehicle identifier that was determined to be the same for all the tyre monitoring devices at block 902 or one of the vehicle identifiers determined in blocks 906 and 908.

In one example, as least one of the method steps described in relation to blocks 902, 906, and 908 may be carried out by an entity other the control device 12, for instance, a central management system operating on a server computer. That is, the control device 12 may forward data received from tyre monitoring devices to such an entity for further processing. This may depend on the processing and/or memory resources of the control device 12 at a particular time.

In another example, a determination may be made as to which vehicle identifier is associated with responses from tyre monitoring devices associated with all the wheels of a same vehicle. That vehicle identifier may then be selected to be the subject of a command to check a tyre pressure without further user input. For example, although responses may be received from several vehicles, it is likely that only one will have a full set of responses from all the tyre monitoring devices associated with that vehicle, such as all six wheels of a typical single-aisle or narrow body aircraft. This is because a user of the control device is likely to be close to the aircraft for which a measurement is required, such that some tyre monitoring devices of other nearby vehicles may be out of wireless communication range.

In one example, a user-confirmatory step may be incorporated before any commands are transmitted to tyre monitoring devices. For instance, an indication of a vehicle identifier which has been automatically selected to be the subject of the request to check tyre pressure following the method of FIG. 9 is presented to a user on a display of the control device 12. The user may then provide an input to the control device to confirm that automatic selection or a different vehicle identifier and a command may be sent to the devices associated with whichever vehicle identifier input is received for. Such a display may have a time period associated with it, and if no input is received within the time period, for example within 5 seconds, 10 seconds, 20 seconds or 30 seconds, a tyre pressure measurement command may be sent to tyre pressure monitoring devices associated with the automatically selected vehicle identifier. In this way, overriding of the automatically selected vehicle identifier is possible, which enables overriding of an incorrect automatic selection, without unduly increasing the time required or further input if the automatic selection is correct.

In examples launched from an on-board system, a vehicle identifier may be predetermined and stored in association with the on-board system. In that case the stored vehicle identifier may be selected automatically.

Temporal Synchronisation Between a Plurality of Tyre Monitoring Devices

Figure 10:
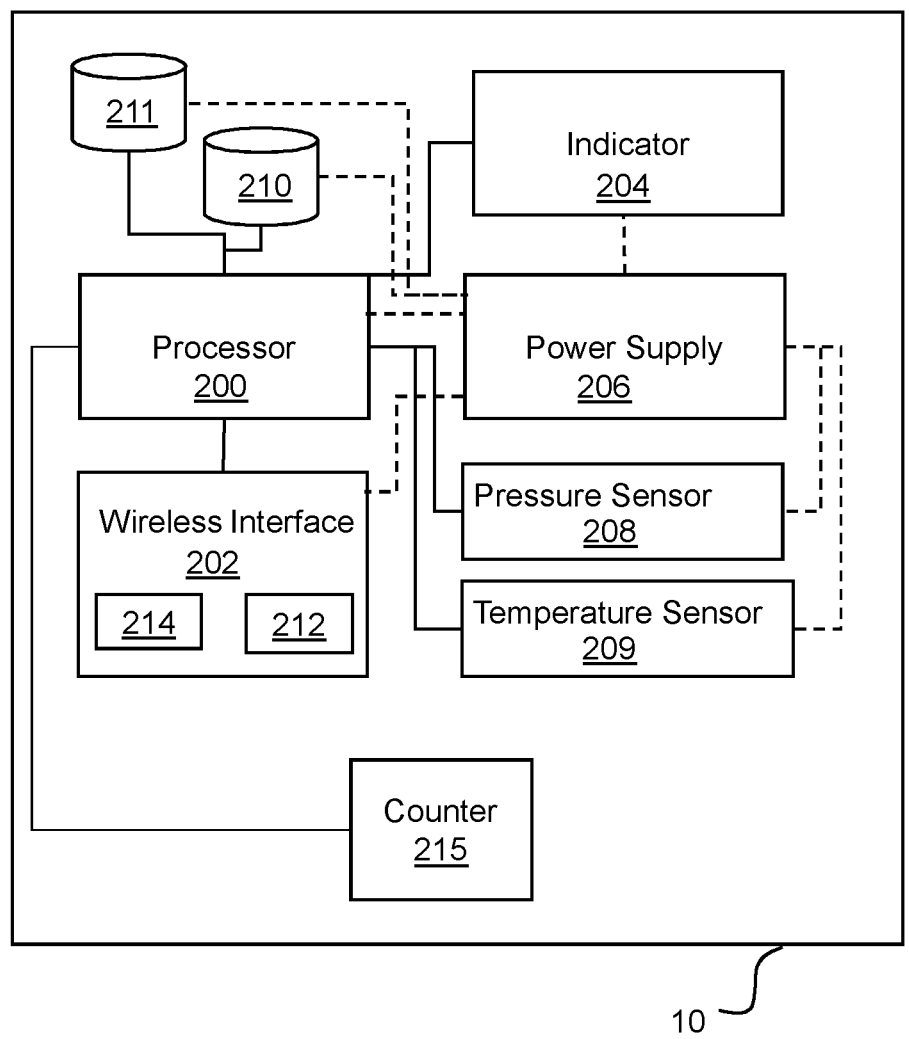
FIG. 10 shows a schematic representation of a tyre monitoring device for use in the example of FIG. 1.

FIG. 10 shows a schematic representation of a tyre monitoring device for use in the example of FIG. 1. The tyre monitoring device 10 of FIG. 10 is the same as that of FIG. 2 but with an additional component: a counter 215. The counter 215 may be a clock counter and is coupled to the processor 200. The counter 215 is configured to increment a count periodically following its activation. Accordingly, the count of the counter is a metric representative of an elapsed time period since activation of the counter 215. The counter can be activated on a first use of the tyre monitoring device, for example when it is first installed on a wheel, or from a manufacturing date of the tyre monitoring device. The counter 215 may not be reset once it has been activated or may be reset each time the tyre monitoring device is configured with a new vehicle identifier.

In one example, the first use of the tyre monitoring device corresponds to a point in time at which the tyre monitoring device enters a normal operation mode, for instance, from a power off mode or from a low power mode, with most of the components other than the processor and wireless communication interface powered off. Accordingly, the service life of the tyre monitoring device can be understood to be the period starting from the first use of the device and continuing through any subsequent periods of lower power, such as the low power mode, until the tyre monitoring device either stops working or is powered off.

During the service life of the tyre monitoring device the counter is incremented periodically from an initial value. In some examples, the counter is initialized at zero. Thus, the counter provides a measurement of the time the tyre monitoring device has been in service. Due to the periodic nature of incrementing the counter, the time in service can be determined directly from the counter value, for example the counter may be incremented once a second, so that a predetermined service life can be encoded using a 32-bit binary value, for example, a service life of 1, 2, 3, 4, 5 or more years. Other time periods may also be used depending on the accuracy required, for example incrementing the counter once a minute would allow a predetermined service life to be encoded using a 24-bit binary value, as before, the predetermined service life may be a time period of 1, 2, 3, 4, 5 or more years. What is important is the counter is incremented periodically so that the difference between two values of the counter can be equated to a known time difference. However, as the tyre monitoring devices may all have been activated at different times, the values of their respective counters will all be different and cannot immediately be equated to the actual time. It would be desirable to be able to convert the counters of the tyre monitoring devices to all be in the same time reference, for example using a time standard such as Coordinated Universal Time (UTC) or using a local time zone, for example, the local time in London, UK or Paris, France, of a control device or a device which is analysing data from the tyre monitoring devices.

Figure 11:
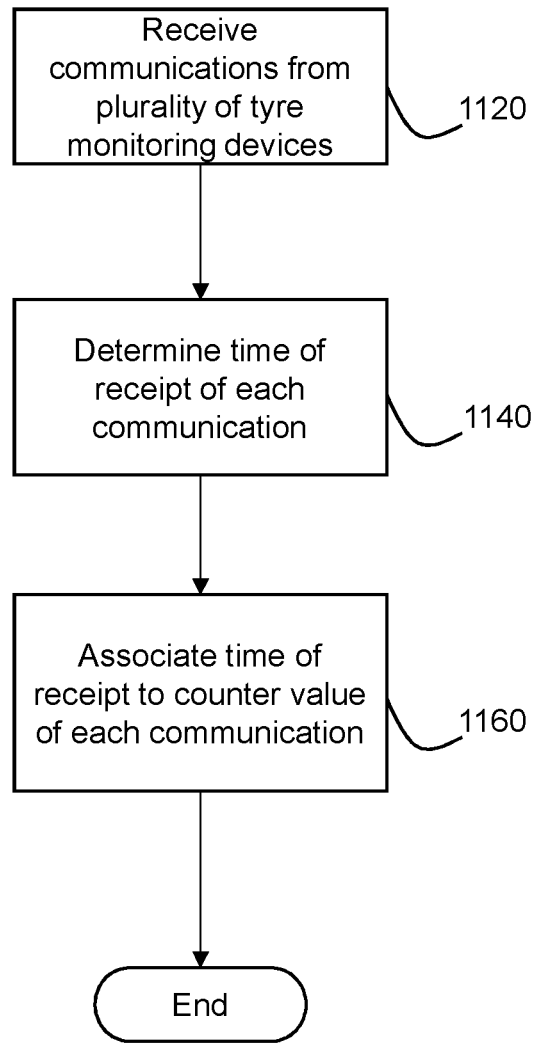
FIG. 11 is a flow chart of synchronizing events across a plurality of tyre monitoring devices that can be used with the example of FIG. 1.

FIG. 11 is a flow chart of an example method synchronizing events across a plurality of tyre monitoring devices. The method of FIG. 11 is carried out at the control device 12.

First, at block 1120, communications are received from respective ones of the plurality of tyre monitoring devices. Each communication contains a current value or count of a counter 215 of the corresponding tyre monitoring device 10. The current value of the counter may be incorporated into a communication as a time stamp, for example. In some examples, the communications may be transmitted by the tyre monitoring devices in response to a request received by the control device 12 and in such a case would be understood to be "pull" communications. Alternatively, the communications may be sent to the control device 12 without any prompt from the control device and in such a case would be understood to be "push" communications.

Next, at block 1140, the time of receipt of each communication is determined. The time of receipt is based on a time local to the control device 12, for example, the time of an internal real-time clock of the control device 12, or the time at another reference, for example Coordinated Universal Time (UTC). Local time may be useful for interpretation of information on the control device, while UTC may be useful for interpretation of information elsewhere, such as a central maintenance department which may be located in another time zone than the control device.

At block 1160, the time of receipt of each communication is associated with the current value of the counter encoded in the communication so that the current values included in each communication can be mapped to a time local to the control device such that the current values are designated a local time.

In one example, each communication also contains information relating to one or more events at the tyre monitoring device. For example, data of a plurality of tyre measurement events may be provided giving a history over time at the tyre monitoring device. As the counter increments periodically, the relative time of these events can be determined from the counter alone, but this is not related to real-time and events between different tyre monitoring devices cannot easily be synchronized. Determining a local time that corresponds to the current value of the counter enables an order of the events, relative to one other, to be established across a plurality of tyre-monitoring devices with counters that are not synchronized. For example, a temporal order of the events. In this way, events and their associated time may be correlated. This may then be used with other data, for example known data of flight times, take-off times and landing times.

In some examples, the data relating to at least event can have associated location data. The location data can be added to the events at block 1160, so that it relates a location at which the event data was provided to the control device, or the location of the control device when the event data was provided. Location data can be added by using a location service available to the control application, such as a GNSS (Global Navigation Satellite System), including GPS, GLONASS and Galileo, or other system, such as WiFi or mobile network based positioning system.

In one example, as least one of the method steps described in relation to blocks 1140 and 1160 may be carried out by an entity other the control device 12, for instance, a central management system, such as a central server system. That is, the control device 12 may forward data received from tyre monitoring devices to such an entity for processing. Such a central management system can allow data for a fleet of vehicles, such as a fleet of aircraft to be monitored and analysed. For example the central management system may be associated with an aircraft operator, such as an airline, an aircraft maintainer serving several airlines, or an aircraft manufacturer.

An event at the tyre monitoring device, may be an action that occurs at the tyre monitoring device, for example any of: taking a temperature and/or pressure reading for a tyre; identification of an error or fault in operation of any of the components of the device; reaching a certain level of memory capacity of storage components 210 and 211; and reaching of a specific level of power capacity of the power supply.

In general terms, the control device 12 may identify an event that occurred at a tyre monitoring device and an associated value of a counter of the tyre monitoring device. A difference between the associated value and the current value received in a communication at the control device may then be determined. The difference is then translated into a time period. A time of the event in a time local to the control device is determinable based on the difference. For example, the time may be determined by subtracting the time period from the local time corresponding to the time of receipt of the communication by the control device.

As a specific example, an event may be a fault that is recorded as occurring at a tyre monitoring device at a specific count value of the counter of the tyre monitoring device, for instance at count 47304000. The control device 12 may identify such a fault by referencing an event or fault log, or be notified of such a fault. Afterwards, the control device 12 may receive a communication from the same tyre monitoring device, the communication containing the count 47308600. The control device 12 may then determine the difference between the counts as 4600, and then depending on the frequency of the periodic counting of the counter, a time difference, in a time local to the control device, may be calculated. For example, if the counter is incremented once per second, the difference of 4600 corresponds to an elapsed time of 4600 seconds. Accordingly, the time of the fault can be derived by subtracting the elapsed time from the time of receipt of the communication. If the time of receipt was 10:30 on 26 Feb. 2019, the fault occurred 4600 seconds earlier, at 09:14 on 26 Feb. 2019.

In some examples, the control device 12 may store the time of an event in an event log for future reference or processing. For instance, such an event log may be analysed to determine an order of events for a particular tyre monitoring device or vehicle. The control device 12 may generate the event log as it receives communications from the plurality of tyre monitoring devices. In some examples the event log may be transmitted to another device for analysis and monitoring.

Table 1 below depicts an example where counts are received from a tyre monitoring device associated with pressure and temperature measurements and mapped to local times for the control device.

TABLE 1

Nose Left (WHL 5) Pressure-Temperature History Data

| Pressure (psi) | Temperature (degrees Celsius) | Counter value | Local time |
| --- | --- | --- | --- |
| 178 | 23 | 86918400 | 29 Jan. 2019 14:09 |
| 178 | 23 | 86917800 | 29 Jan. 2019 13:59 |
| 178 | 23 | 86917200 | 29 Jan. 2019 13:49 |
| 178 | 23 | 86916600 | 29 Jan. 2019 13:39 |
| 200 | 25 | 86916000 | 29 Jan. 2019 13:29 |
| 223 | 27 | 86915400 | 29 Jan. 2019 13:19 |

For the example of Table 1, the tyre monitoring device is located at the "Nose Left" position, or wheel 5 "WHL 5", which is part of the nose landing gear 540 of the aircraft 500 of FIG. 5. Each count value is received from the same tyre monitoring device so can be compared relative to one another to establish an order of temperature and pressure readings.

The pressure reading 178, the temperature reading 23 and the count of 86918400 are received in a communication at the control device 12 at a local time of 29 Jan. 2019 14:09. For example they may be received in response to a request for a temperature and pressure measurement transmitted by the control device. In addition, historical data of events is also provided to the control device along with their associated timestamp (rows 2-6 of table 1). In the example of Table 1, the difference between the count 86918400 of row 1 and count 86917800 of row 2 is 600 counts. As such, for a counter incremented once per second the difference of 600 counts is equivalent to 600 seconds. Thus, the local time associated with the second row can be determined by subtracting 600 seconds from the local time associated with the first row. Subtraction is used because the count value of the first row is larger than that of the second row, which indicates that the count of the first row is associated with a later time, due to the incrementation of the count as time passes. The local time for the second row is therefore 14:09 minus 600 seconds (10 minutes). This equals 13:59. Similarly the local time for all the other rows can be determined by subtracting the count from row 1, converting this to a time period and then subtracting this from the reference time associated with row 1.

In other examples, the difference between the count values associated with different pressure readings may be any number, for example, 1 count, 100, 500, 600, 1000, 3600, etc.

In some examples, the reference time may be established in the past relative to the values received. For example a reference time may have been established and then data of later events and associated counts are received. A similar process can then be used but with addition. For example if the reference time is the last row (row 6) of Table 1, the count difference between 86915400 of row 6 and 86916000 of row 5 is 600, corresponding to a difference of 600 seconds (10 minutes). The local time associated with row 5 can be determined by adding 600 seconds to the local time associated with row 6. Addition is used because the count value of row 6 is smaller than that of row 5, which indicates that the event of row occurred at an earlier time than row 5. The local time for the penultimate row is therefore 13:19 plus 600 seconds or 13:29.

Whilst the counter 215 has been described as operating by incrementing its count as time passes, as an alternative, the counter 215 may count down from a predetermined count value as time passes. For example, such a counter may decrement its value at a rate of 1 count per 1 second and the predetermined count value may correspond to a predetermined period of operational life for the tyre monitoring device. As such, if a communication from a tyre monitoring device includes a lower counter value than another communication received from the same device, the communication with the lower counter value was received by the control device 12 at a later time.

Further examples are defined in the following features.

Feature 1: A control device for controlling a plurality of tyre monitoring devices, the control device comprising:

a wireless communication interface configured to communicate with the plurality of tyre monitoring devices;

storage configured to store computer-readable instructions; and a processor configured to execute the computer-readable instructions stored in the storage to:

receive a communication from a tyre monitoring device, the communication comprising a current value of a counter of the tyre monitoring device, wherein the counter is configured to be activated on first use of the tyre monitoring device and to increment a count periodically throughout the service life of the tyre monitoring device; and associate a time of receipt of the communication to the current value of the counter, such that the current value maps to a time. The time may be a time local to the control device or a reference time, such as UTC.

Feature 2: The control device of feature 1, wherein the processer is further configured to:

identify an event that occurred at the tyre monitoring device and a value of the counter of the tyre monitoring device at the time of the event;

determine a difference between the value of the counter at the time of the event and the current value of the counter; and determine a time of the event based on the difference. For example, the time may be determined by subtracting a time period corresponding to the difference from the local time corresponding to the time of receipt of the communication by the control device.

Feature 3: The control device of feature 2, wherein the processor is configured to store the time of the determined time of the event in an event log.

Feature 4: The control device of Feature 1, 2 or 3, wherein the communication received by the control device includes information relating to at least one additional event and a counter value associated with the event and the processor is configured to convert the counter value associated with the event into a corresponding time using the counter value and the event.

Feature 5: The control device of Feature 4, wherein the processor is configured to generate an event log using the corresponding times and identifiers.

Feature 6: A tyre pressure measurement system comprising:

a plurality of tyre monitoring devices; and a control device as defined in one of Features 1 to 5;

each of the plurality of tyre monitoring devices comprises:

a wireless communication interface configured to communicate with the control device;

a counter configured to increment a count periodically throughout the service life of the tyre monitoring device; and a processing system configured to:

determine a current value of the counter and send a communication to the control device, the communication comprising the current value.

Feature 7: The tyre pressure measurement system of Feature 6, wherein the processing system of the tyre monitoring devices is further configured to store data of plurality of events and associated counter values and transmit data of the events of plurality of events and associated counter values to the control device.

Feature 8: A method for synchronising events across a plurality of tyre monitoring devices, the method comprising, at a control device:

receiving communications from respective ones of the plurality of tyre monitoring devices, each communication containing a count of a counter of the corresponding tyre monitoring device and information relating to an event at the tyre monitoring device, where the counter is configured to increment a count periodically throughout the service life of the tyre monitoring device;

determining a time of receipt of each communication, to establish a mapping between the time of receipt and the count for example tyre monitoring device;

using the mapping to convert counts associated with other events at the tyre monitoring device into a time.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of checking tyre pressures using a control device having a wireless communication interface and at least one tyre monitoring device, each tyre monitoring device mounted on a respective wheel of a vehicle and comprising a wireless communication interface and a pressure sensor for sensing an inflation pressure of a tyre on the respective wheel, the method comprising, at the control device:

receiving an input and, responsive to the input:

identifying a plurality of tyre monitoring devices within a wireless communication range of the control device, wherein the identifying comprises receiving responses from each tyre monitoring device within the wireless communication range, each response including a vehicle identifier associated with a vehicle upon which the tyre monitoring device is installed;

selecting a vehicle identifier to be the subject of the request to check a tyre pressure based on the received responses from the tyre monitoring devices; and sending a request to check tyre pressure to at least one tyre monitoring device associated with the selected vehicle identifier.

2. The method of claim 1, further comprising:

determining that the plurality of tyre monitoring devices are associated with a same vehicle identifier; and automatically selecting the same vehicle identifier to be the subject of the request to check a tyre pressure.

3. The method of claim 1, further comprising:

determining that the plurality of tyre monitoring devices are associated with at least two different vehicle identifiers; and selecting a vehicle identifier associated with the largest number of the plurality of tyre monitoring devices to be the subject of the request to check tyre pressure.

4. The method of claim 1, further comprising:
determining that the plurality of tyre monitoring devices are associated with at least two different vehicle identifiers;
determining a tyre monitoring device closest to the control device; and
selecting a vehicle identifier associated with the tyre monitoring device closest to the control device to be the subject of the request to check tyre pressure.

5. The method of claim 1, further comprising:
determining that the plurality of tyre monitoring devices are associated with at least two different vehicle identifiers;
determining a vehicle identifier which is associated with responses from tyre monitoring devices associated with all the wheels of a same vehicle; and
selecting the vehicle identifier to be the subject of the request to check tyre pressure.

6. The method of claim 1, further comprising:
providing an indication of a vehicle identifier which is the subject of the request to check tyre pressure via the control device;
receiving an input indicative of a different vehicle identifier; and
sending a request to check tyre pressure to tyre pressure monitoring devices associated with the different vehicle identifier.

7. A control device for controlling a plurality of tyre monitoring devices, the control device comprising:
a wireless communication interface configured to communicate with the plurality of tyre monitoring devices;
storage configured to store computer-readable instructions of a control application that controls the plurality of tyre monitoring devices; and
a processor configured to execute the computer-readable instructions stored in the storage to:
initiate a scan for plurality of tyre monitoring devices proximal the control device using the wireless communication interface;
receive responses from tyre monitoring devices of the plurality of tyre monitoring devices, each response including a vehicle identifier associated with a vehicle upon which the tyre monitoring device is installed;
select a vehicle identifier, based on the received response from the tyre monitoring devices, automatically without user input; and
cause the wireless communication interface to send a request to check a tyre pressure to at least one tyre monitoring device associated with the vehicle identifier.

8. The control device of claim 7, wherein the processor is configured to:
determine that the plurality of tyre monitoring devices are all associated with a first vehicle identifier; and
select the first vehicle identifier to be the subject of the request to check a tyre pressure.

9. The control device of claim 7, wherein the processor is configured to:
determine that the plurality of tyre monitoring devices are associated with at least two different vehicle identifiers; and
select a vehicle identifier associated with the largest number of the plurality of tyre monitoring devices to be the subject of the request to check tyre pressure.

10. The control device of claim 7, wherein the processor is configured to:
determine that the plurality of tyre monitoring devices are associated with at least two different vehicle identifiers;
determine a tyre monitoring device closest to the control device; and
select a vehicle identifier associated with the tyre monitoring device closest to the control device to be the subject of the request to check tyre pressure.

11. The control device of claim 7, wherein the processor is configured to:
determine that the plurality of tyre monitoring devices are associated with at least two different vehicle identifiers;
determine a vehicle identifier which is associated with responses from tyre monitoring devices associated with all the wheels of a same vehicle; and
selecting the vehicle identifier to be the subject of the request to check tyre pressure.

12. A non-transitory computer-readable medium comprising computer-readable instructions that, when executed by a processor of a control device, cause the control device to, in response to a received input:
identify a plurality of tyre monitoring devices within a wireless communication range of the control device, wherein the identifying comprises receiving responses from each tyre monitoring device within the wireless communication range, each response including a vehicle identifier associated with a vehicle upon which the tyre monitoring device is installed;
select a vehicle identifier to be the subject of the request to check a tyre pressure based on the received responses from the tyre monitoring devices; and
send a request to check tyre pressure to at least one tyre monitoring device associated with the selected vehicle identifier.

* * * * *